Oct. 12, 1926. 1,602,464
C. STEDEFELD
RUNNING GEAR FOR HIGH SPEED SUSPENSION CARS
Filed Jan. 24, 1925 2 Sheets-Sheet 1
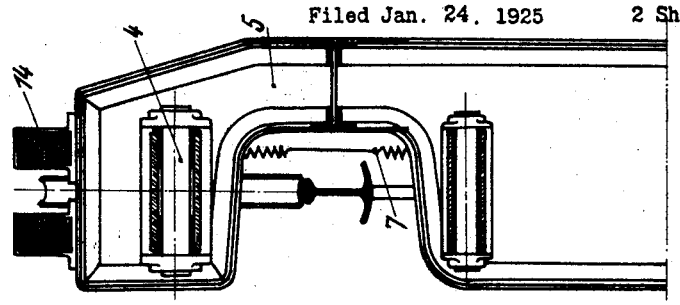
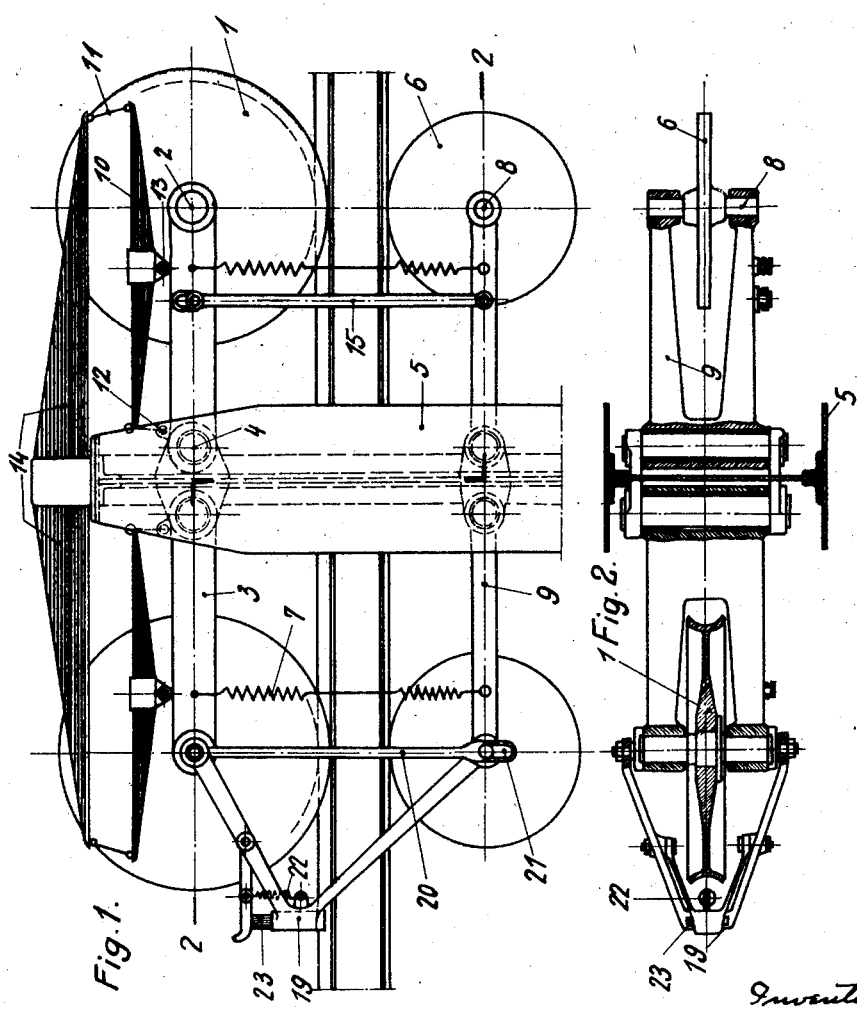
Inventor:
Curt Stedefeld,
By Byrnes, Townsend & Brickenstein,
Attys.

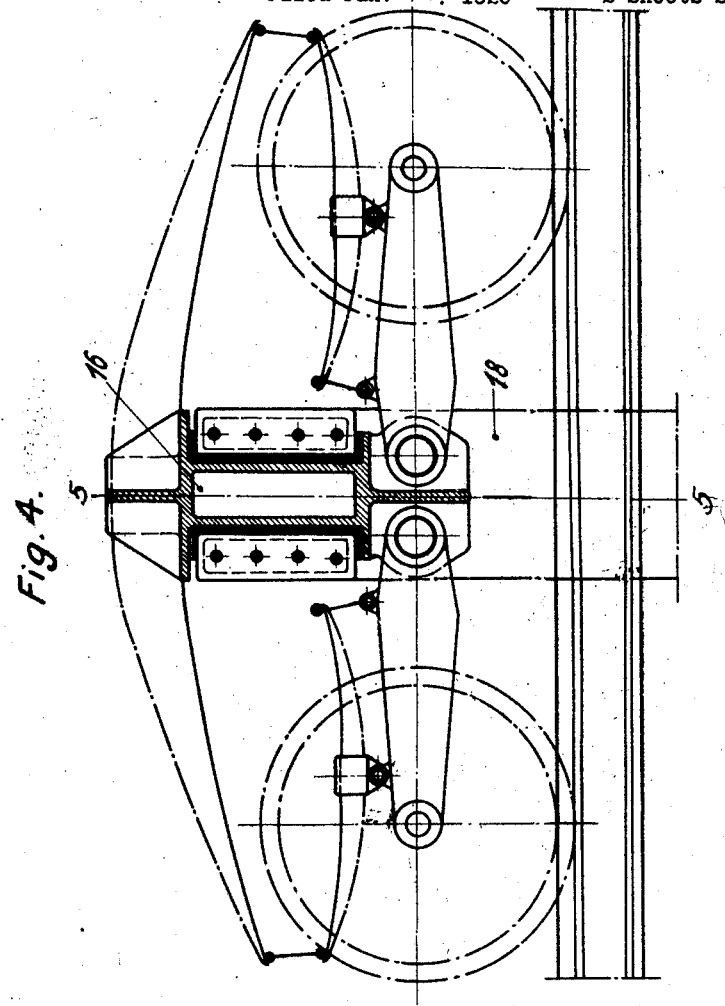
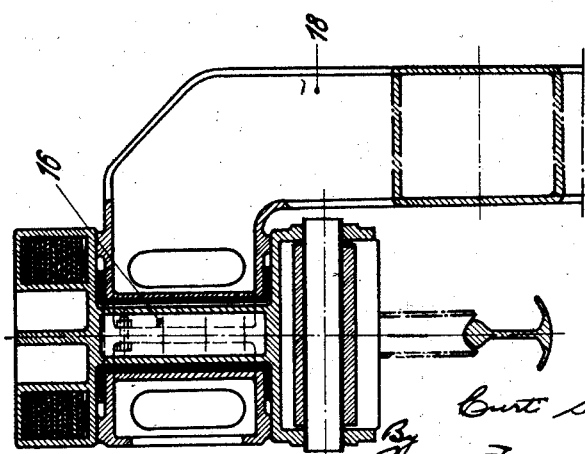

Patented Oct. 12, 1926.

1,602,464

UNITED STATES PATENT OFFICE.

CURT STEDEFELD, OF HEIDELBERG, GERMANY, ASSIGNOR TO FRANZ KRUCKENBERG, OF HEIDELBERG, GERMANY.

RUNNING GEAR FOR HIGH-SPEED SUSPENSION CARS.

Application filed January 24, 1925. Serial No. 4,573, and in Germany October 30, 1924.

The running wheels of high-speed suspension cars which travel with very great velocity, (up to 225 m. p. h.) must be supported vertically in a very elastic manner, because very small inequalities of the rail exert extraordinarily sudden and severe pressures. The influence of inequalities of the track increases with the square of the velocity. Therefore in the case of railways with such high speeds the suspension and bearings of the running wheels must be carried out in a different manner to that hitherto employed on the ordinary railway cars which have their axle-boxes carried in vertical guides.

The drawings show such a method of carrying the running wheels suitable for high-speed suspension railways.

Fig. 1 shows the general arrangement of the running wheels and counter wheels in side elevation.

Fig. 2 a section on the line 2—2 of Fig. 1.

Fig. 3 a vertical section through the supporting arm.

Fig. 4 is a side view of an alternative arrangement of the suspension of the running wheels and bearings on the supporting arm.

Fig. 5 is a vertical section on plane 5—5 of Fig. 4.

As the drawings show the axles 2 of the running wheels 1 are carried in forks 3, which are themselves hinged at the shackle-bolts 4. These bolts are carried by the supporting arm 5, which is an integral part of the car-body. On the lower surface of the rail runs the counterwheel 6, which is connected with the running wheel by the spring 7, so that both wheels are continuously pressed together on to the rail and the counter-wheels are always running in conjunction with the running wheels. The axles 8 of the counter wheels are carried in the same manner as the running wheels in hinged forks 9, so that the forks 3 and 9 with the springs 7, form a parallel motion. The springs 7 in consequence always exert an equal pressure of the wheels on the rail however great the oscillations of the car on the leaf-springs 10 and 14.

The weight of the car body itself is carried on a supporting-arm 5. It is then transmitted in a very elastic manner through the double system of long leaf springs 10—13—14, the spring shackles 11 and 12 to the fork 3 so that although the wheel 1 rides up inequalities of the rail, the passengers in consequence experience only a negligible deflection of the car body. The advantage of this arrangement in respect of extraordinarily elastic springing would be somewhat offset by the fact that on encountering an inequality the light running gear 1—2—3 would bounce high above the surface of the rail in consequence of the vertical blow received, because the very weak spring system 10—13—14 cannot oppose an appreciable resistance. In this invention this is prevented by the second spring 7 between running-wheel 1 and counter wheel 6. This spring 7 has only a few small diameter coils of stiff wire and in the case of the running wheel and counter wheel separating, forces the running wheel down on the rail, so that in traversing an inequality in spite of the high speed the bouncing of the running wheels cannot cause a derailment. Naturally other springing systems can be used in place of the coil spring 7 e. g. leaf springs, while any well known damping devices can be included so long as the bouncing of the wheel is opposed by a very steeply ascending force.

In order absolutely to prevent a derailment, in addition to the spring 7 a rod 15 can be arranged preferably of some very tough elastic material, connecting the forks 3 and 9 in a parallel motion. This rod has in one end a slot to allow a certain amount of play between the running wheel and the counter-wheel but entirely preventing the flange of the running wheel from riding up over the railhead. In this case the safety-rod 15 holds the running wheel and counter wheel forcibly together. The material, being very tough, can absorb the last of the energy of a very severe bounce by being permanently lengthened.

A similar construction to 15 can be arranged as guiding mechanism for a rail-scraper 19 shown in Fig. 1 left-hand side. The cleaning of very small particles from the rail becomes more important as the speed increases and the rail scraper must be maintained very close to the surface of the rail. Should the rail-scraper be simply bolted to the fork 3 it would move up and down with the swings of the car body on the leaf springs 10—13—14. The distance of the rail scraper is therefore maintained constant above the rail by bolting it to one of the parallel motion safety rods 20, hinged at the upper end at the axis of the running wheel 1 and at the lower end at the axis of the counter wheel 6. Naturally the free movement of the counter wheel 6 with respect to the running wheel 1 must be preserved by means of the slot 21 in the lower end of the rod 20. In order to remove the finest particles the scraper 19 can be fitted with a sliding body 23 such as a dynamo brush pressed against the rail with a very light spring 22. This sliding body may be made of a material of very low friction and good wearing qualities such as high graphite iron or similar substance.

The new arrangement of hinged wheel forks has the added advantage of very small unsprung weight and correspondingly small forces between wheels and rail. By this arrangement of hinged wheel forks only the wheel itself with axle and bearings experiences the full velocity of vertical disturbances while the main running gear including the forked arm 3 and the springs 10 and 14 are positioned more or less close to the hinge 4 and therefore experience smaller deflections than the wheel and as is well known corresponding smaller forces (inversely with the square of the speed).

Further the bearings can be machined very exactly by turning, drilling and grinding so that play in the bearings and jamming in the guides can be avoided in contradistinction to the railway axle boxes. If play existed the parts of the wheelwork would develop a shake which would call great forces into action causing them to wear themselves out in a very short time.

As the drawings show two pairs of wheels and counter wheels are combined into one running gear, the hinge bolts of the forks close together at the center and the wheels arranged on either side of them. The hinge bolts of the forks 3 and 9 are arranged as already explained on the supporting arm 5 which is an integral part of the car body. It is clear that the running gear must, in traversing curves, remain tangential to the rail. In the case of fast railways, the curves must be of great radius so that the angular movement of the running gear will only be comparatively small. In most cases the supporting arm can be made so as to oppose a high resistance to horizontal and vertical forces while remaining readily twistable without overstrain of material. For this purpose the supporting arm must have a section of X or H form as Figs. 2 and 3. With a bogie of such construction, whenever it is twisted with respect to the car will always be returned into track by the elasticity of the supporting arm 5.

In Figs. 4 and 5 is shown a running gear for a very long car, the bogie being mounted on a kingpin 16, on which fits the bearing 17 in the supporting arm 18. The kingpin 16 can rotate freely in the bearing 17 in a vertical axis and consequently the running gear can retain its position on the curves. Control springs, by means of which the bogie is returned to track are also advisable. As Fig. 5 shows, the section of the supporting arm 18 is a closed rectangle because no axial twisting is required.

What I claim is:

1. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; and elastic means for holding the said levers in proper position, substantially as set forth.

2. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; counter-wheels so arranged as to contact with the bottom-face of the rails; and means connecting said counter-wheels with the said travelling wheels, substantially as set forth.

3. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; and means connecting said counterwheels with the said travelling wheels, substantially as set forth.

4. In combination with a suspended high-speed car: rigid car-carrying members projecting from the car upwards to above the rail; one armed levers hinged indirectly to said members and extending practically horizontally over the rail; car-carrying travelling wheels attached to the free ends of said levers; springs affixed to the tops of the said rigid members, and other springs attached to said levers and being connected with the first-mentioned springs, substantially as set forth.

5. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; and springs connecting the upper and the lower levers with one another, substantially as set forth.

6. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; laminated springs affixed to the tops of the said rigid members, and other springs attached to said levers and being connected with the first-mentioned springs; and helical springs connecting the upper and the lower levers with one another and being adapted to act independently of said laminated springs, substantially as set forth.

7. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; and bars connecting the upper and the lower levers with one another and permitting some play of the lower wheels relatively to the upper ones, substantially as set forth.

8. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; a rail-scraper in front at least of each front travelling wheel and structures extending forward from the centres of the respective travelling wheels and the appertaining counter-wheels and having the rail-scrapers secured to them, substantially as set forth.

9. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; a rail-scraper in front at least of each front travelling wheel and frames hinged to the axles of the front travelling wheels and the appertaining counter-wheels and having the rail-scrapers secured to them, substantially as set forth.

10. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; elastic means for holding the said levers in proper position; other one-armed levers also hinged indirectly to said members and extending practically horizontally below the rails, counter wheels attached to the free ends of said other levers and arranged to contact with the bottom-face of the rails; frames extending forward from the centres of the respective travelling wheels and the apertaining counter-wheels, and a rail-scraper in each of these frames in front of the respective travelling wheel, each scraper comprising a scraping body sliding with slight friction on the rail and consisting of a material undergoing only slight wear and tear, and a guide-casing for said body, substantially as set forth.

11. In combination with a suspended high-speed car: rigid car-carrying members projecting from the car upwards to above the rail; one-armed levers hinged indirectly to said members and extending practically horizontally over the rail forward and rearward; car-carrying travelling wheels attached to the free ends of said levers; other one-armed levers also hinged to said members and extending horizontally below the rail forward and rearward; counter-wheels attached to the free ends of said other levers; and means connecting the upper and the lower levers with one another, substantially as set forth.

12. In combination with a suspended high-speed car: rigid car-carrying members projecting from the car upwards to above the rails; vertically disposed axles in said members; one armed levers hinged to said axles and extending practically horizontally over the rail; car-carrying travelling wheels attached to the free ends of said levers; and elastic means for holding the said levers in proper position, substantially as set forth.

13. In combination with a suspended high-speed car; rigid car-carrying members projecting from the car upwards to above the rail; one-armed levers hinged indirectly to said members and extending practically horizontally over the rail; car-carrying travelling wheels attached to the free ends of said levers; and elastic means for holding the levers in proper position, the profile of the said means being such that these latter behave comparatively rigidly with respect to forces acting in horizontal and vertical direction, but permit elastic rotational deviation, substantially as set forth.

14. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; and elastic means for holding the levers in proper position, the profile of the said means resembling a T, substantially as set forth.

15. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; and elastic means for holding the levers in proper position, the profile of the said means resembling a cross, substantially as set forth.

16. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; springs affixed to the tops of the said rigid members, and other springs attached to said levers at some distance from their free ends, and being connected with the first-mentioned springs, substantially as set forth.

17. In combination with a suspended high-speed car: rigid car-carrying members projecting from the car upwards to above the rail; one-armed levers hinged indirectly to said members and extending practically horizontally over the rail; car-carrying travelling wheels attached to the free ends of said levers; springs affixed to the top of the said rigid members and extending over the free ends of said levers; and other, shorter laminated springs attached to said levers near their free ends and being connected at one end with these levers near the other end thereof and at the other end with the first-mentioned levers, substantially as set forth.

In testimony whereof I affix my signature.

CURT STEDEFELD.